June 8, 1926.

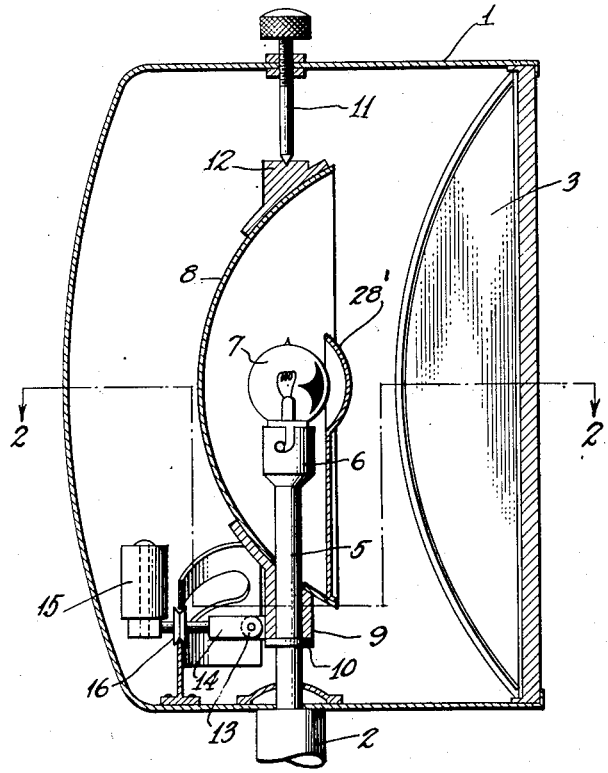
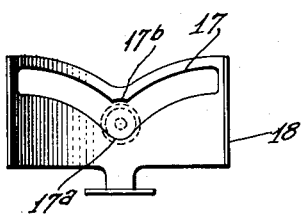
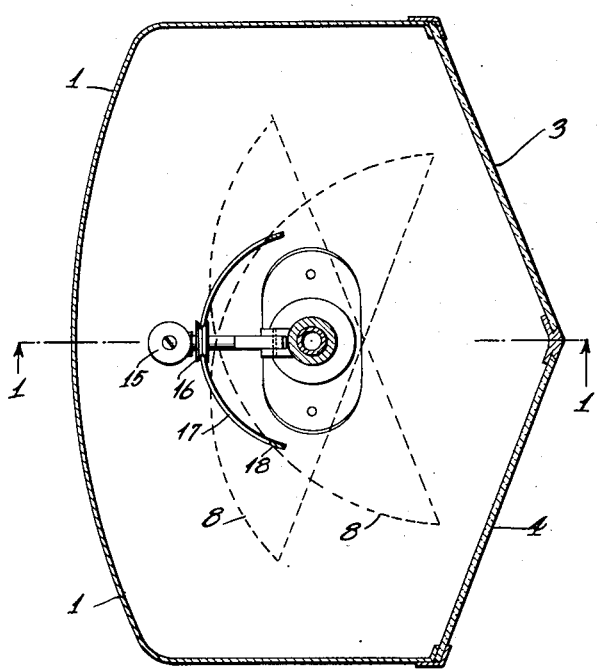

R. REYMOND

AUTOMOBILE HEADLIGHT

Filed May 26, 1924

INVENTOR.
Roger Reymond
BY Jas. H. Griffin
ATTORNEYS.

Patented June 8, 1926.

1,588,053

UNITED STATES PATENT OFFICE.

ROGER REYMOND, OF BRONX, NEW YORK, ASSIGNOR TO CURVE-LITE CORPORATION, OF NEW YORK, N. Y., A CORPORATION OF NEW YORK.

AUTOMOBILE HEADLIGHT.

Application filed May 26, 1924. Serial No. 715,795.

This invention relates to automobile headlights and the object of the invention, broadly stated, is to provide such a headlight that it will automatically be controlled by the combined actions of centrifugal force and gravity to throw a beam of light in the path of the car on a curved as well as a straight road.

Headlights adapted to be controlled, in a measure, by centrifugal force have heretofore been proposed for use on railway locomotives, but inasmuch as the problem incident to such a use is pronouncedly different and distinct from the problem of illuminating the path of a road vehicle, these prior devices are not satisfactory when used on automobiles. From a more specific standpoint therefore, the object of the invention is to provide an automobile headlight adapted to throw a beam directly in the path of the car, without flicker but very sensitive to changes in directional movements of the car. In other words, it is the purpose of this invention to so construct the headlight that when the car is moving along a straight road, the beam of light projected therefrom will be steady and will not vibrate laterally.

Although the invention may partake of various practical embodiments, the underlying principle remains the same in that I utilize in every instance a relatively stationary lamp casing in which a reflector is mounted for pivotal movement about the axis of a preferably fixedly positioned source of illumination. The center of weight of the movable reflector is exterior of its axis of rotation with the result that when the car on which the lamp is mounted deviates from a rectilinear path, centrifugal force acts upon the reflector to cause a shifting thereof with consequent change in direction of projection of the beam so that the beam is at all times substantially tangent to the inner circumference of the arc of the road on which the car is travelling.

I oppose this action of centrifugal force by the force of gravity acting through appropriate mechanical means to maintain the reflector in normally untilted position and the means employed to this end is so constructed as to counteract the tendency of rough roads or a crowned road or lateral swinging of the car which would otherwise tend to cause an oscillatory vibration of the reflector with consequent lateral shifting of the beam at such times as the car was moving rectilinearly. The present invention is so constituted that so long as the car is moving straight, the beam will be projected in a steady direction although the reflector will be highly sensitive to changes in direction of movement of the car and will at all times illuminate the road directly in advance of the car.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a vertical central section of a headlight embodying the present invention, this section being taken on the line 1—1 of Figure 2.

Figure 2 is a horizontal section taken on the broken line 2—2 of Figure 1.

Figure 3 is a front elevation of one of the elements of the construction shown in Figures 1 and 2.

Figure 4:
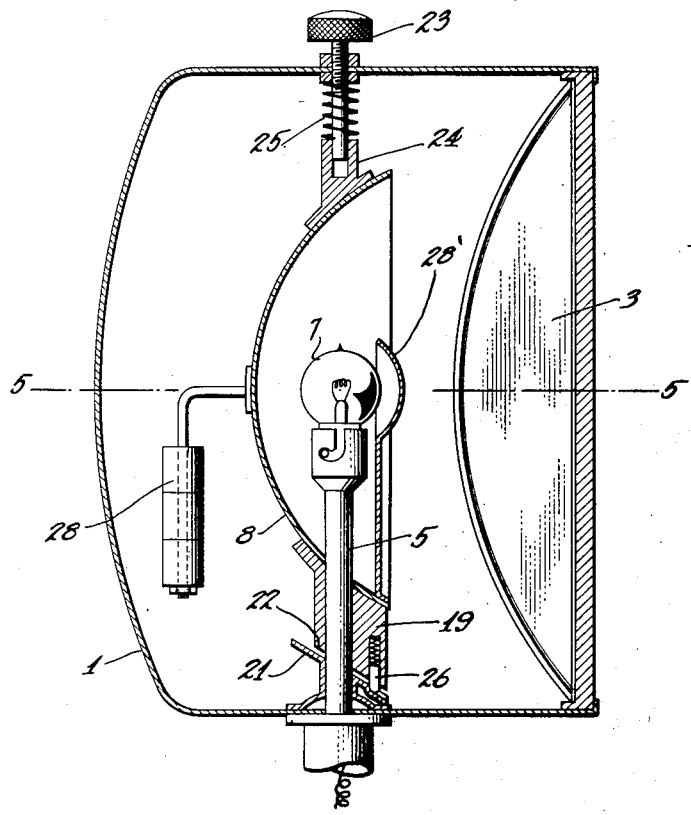
Figure 4 is a view similar to Figure 1, but showing a modified form of construction. This section is taken on the line 4—4 of Figure 5.

Referring to the drawings and more particularly to Figures 1, 2 and 3, 1 designates a lamp housing supported rigidly on a bracket 2 mounted in fixed position on a car. The front of the housing is closed by means of a lens or transparent media. Any suitable form of lens or closure may be used in this connection, but I prefer to employ the type of closure shown in Figures 1 and 2, wherein two plates of glass 3 and 4 set at an angle to one another as shown best in Figure 2 and suitably held in position are employed. The advantage of this construction is that a wide objective results.

Extending inwardly from the bottom of the housing interiorly thereof and in alinement with the bracket 2 is a post 5 at the top of which is mounted a socket 6 adapted to receive an electric bulb 7. The post 5 is hollow and wires for supplying current to the bulb 7 are led through the bracket 2 and through this post to the socket. The post 5 is rigidly mounted with respect to the housing and the bulb 7 is then maintained in fixed position.

Mounted for oscillation coaxially of the post 5 is a reflector 8, the lower portion of this reflector being provided with a suitable hub 9 encircling the post 5 and resting upon a collar 10 fixed on said post. This arrangement forms a bearing for the lower portion of the reflector on the post, while the bearing for the upper portion of the reflector is formed by a thumb screw 11 threaded through the top of the housing and tapered to a point at its lower end. This point bears into a depression formed in the bearing block 12 mounted on the reflector. When thus mounted the reflector is adapted for oscillation on a vertical axis co-incident with the axis of the post 5 and source of light.

Formed on the hub 9 is a lug 13 to which is pivoted an arm 14, which extends in a rearward direction and has a weight 15 mounted thereon. Intermediate the ends of the arm 14 a wheel 16 is mounted for rotation and this wheel is adapted to ride in a slot 17 by a stabilizing member 18. This stabilizing member is curved longitudinally on a radius equal to the distance between said member and the axis of rotation of oscillation of the reflector and it is fixed by rivets, bolts or otherwise, to the housing so as to be rigidly positioned therein.

It will be noted that the cam slot 17 is lowest at its center as shown at 17$^a$ and that at the central portion of its upper edge it has a slight concave portion 17$^b$, the purpose of which will be hereinafter more fully explained. From these central portions, the slot inclines upwardly in both lateral directions and is of such a size that the flanges of the roller 16 will preclude inadvertent disengagement of said roller from the slot.

The utilization of this stabilizing member is of marked importance since it is through its use that the construction is rendered practical for use on road vehicles. When the car is at rest or moving along a rectilinear path, gravity will act upon the weight 15 to cause the roller to be forced downwardly into the central portion 17$^a$ of the slot 17 and when in this position, the reflector will be in its normal position to project the light straight ahead. Uneven roads which cause jarring, swaying or bouncing of the car will not effect swinging of the reflector for the reason that any attempt at bouncing of the weight 15 will be arrested by engagement of the roller with the concave portion 17$^b$ of the cam slot.

Moreover, crowned roads will not effect dislodgement of the roller, since the inclination of the slot 17 on both sides of its medial line is relatively steep. However, when the car comes to a turn in the road and starts to make this turn, centrifugal force which is a strong and positively acting component will cause the weight 15 to be swung in the direction toward the outside of the curve and this force is in practice found to be fully sufficient in causing the roller to roll up the inclined portion of the slot against the action of gravity. In other words, the movement of the reflector is the resultant of the combined forces of centrifugal force and gravity, one acting against the other and thus a more stabilized effect is accomplished.

As soon as the car leaves the curve and proceeds in a straight line, centrifugal force will cease to affect the weight and gravity will act solely so that the reflector will be returned to its normal position.

Figure 6:
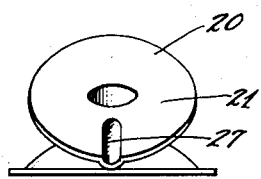
Figure 6 is a front elevation of one of the elements of the construction shown in Figures 4 and 5.
Figure 5:
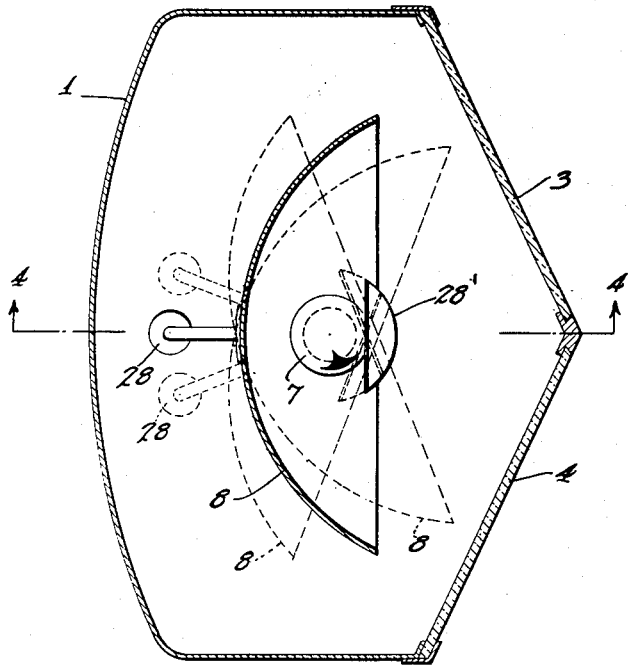
Figure 5 is a section on the line 5—5 of Figure 4.

This arrangement has been found to give very satisfactory results and is the one preferred. However, in Figures 4 to 6, a modified form of the construction is illustrated in order to show its adaptability to different arrangements. In this construction, the housing 1 is, as previously described, and the bulb 7 is mounted on a post 5 as previously stated but the reflector is supported in a slightly different manner for oscillation. The deflector is provided with a hub 19 journalled for rotation on a post 5, but instead of setting this hub on a collar like the collar 10 of Figure 1, the lower edge of the hub 19 is cut on a bevel and rests directly upon a stabilizing member 20, which corresponds in function to the member 18. The member 20 is rigid with the casing and coaxial of the post 5 and the upper face 21 of said member is inclined to correspond with the inclined lower face 22 of the hub 19.

The bearing for the reflector is in the form of a thumb screw 23 threaded through the top of the housing and extending into a depression in a bearing block 24. A spring 25 coiled around the thumb screw between the wall of the housing and the part assists gravity in forcing the reflector downwardly to maintain contact between the inclined surface 22 of the hub and the inclined surface 21 of the stabilizing member so that under normal conditions the reflector will be maintained in its normal position to cast a beam of light straight ahead. In order to preclude vibration from effecting oscillatory vibration of the reflector, a spring pressed pin 26 is preferably associated with the hub 19 and is adapted to normally seat in a depression 27 formed in the surface 21 of the stabilizing member to yieldably hold the reflector in normal position. The reflector is weighted as shown at 28 so that the center of weight of the reflector is exteriorly of its axis of rotation.

With this construction, it will be apparent that when the car is moving rectilinearly the inclined cam surfaces 21 and 22 assisted by the pin 26 will maintain the reflector stationary. However, when the car makes a turn centrifugal force will act to overcome the force of gravity and turn the reflector during which operation the reflector will bodily rise due to the cooperation of the inclined surfaces 21 and 22. As soon as the car finishes the turn and again resumes rectilinear motion, gravity will act to return the parts to normal position. This structure has also been found to give very satisfactory results in practice.

It will be apparent from the foregoing detailed description that the structure is relatively simple and not apt to get out of order while practice has demonstrated its efficiency in operation. In the several figures of the drawings, a small supplementary reflector 28' is shown as positioned directly in front of the bulb and supported on the main reflector in order to obviate direct glare, but this is not essential to the operation of this invention, the scope of which is fully defined by the appended claims.

Having thus fully described the invention, what I claim as new and desire to secure by Letters Patent is:

1. A directional headlight for automobiles embodying a housing, and a lamp positioned within the housing, in combination with a movable reflector mounted for rotation coaxial of the lamp, said reflector being weighted off center of its axis of rotation whereby it is operable by centrifugal force to oscillate in accordance with changes of direction of movement of the car with which the headlight is associated, and cam means for opposing the action of centrifugal force and normally maintaining the reflector in a position to direct a beam of light straight ahead.

2. An automobile headlight embodying a housing adapted to be rigidly mounted on an associated car, a source of illumination within said housing, a reflector mounted for pivotal movement on a vertical axis, a weight associated with said reflector and operable by centrifugal force to effect pivotal movement of the reflector, and a stationary cam surface for opposing the action of centrifugal force and on which the ponderosity of the weight is imposed, said surface being shaped to normally cause the weight to gravitate into a centralized position wherein the light beam will be reflected straight ahead.

3. An automobile headlight embodying a housing adapted to be rigidly mounted on an associated car, a source of illumination within said housing, a reflector mounted for pivotal movement on a vertical axis, an arm pivotally associated with the reflector and extending radially of said axis, a weight carried by said arm, a cam like stabilizing member cooperating with the arm and directing said arm under the force of gravity to normally occupy a position wherein the reflected beam of light will be projected straight ahead, whereby the reflector will be normally maintained in this position so long as the car is moving rectilinearly but is adapted to be oscillated by the weight under the action of centrifugal force when the car changes direction.

4. An automobile headlight embodying a housing adapted to be rigidly mounted on an associated car, a source of illumination within said housing, a reflector mounted for pivotal movement on a vertical axis, an arm pivotally associated with the reflector and extending radially of said axis, a weight carried by said arm, a cam like stabilizing member cooperating with the arm and directing said arm under the force of gravity to normally occupy a position wherein the reflected beam of light will be projected straight ahead, whereby the reflector will be normally maintained in this position so long as the car is moving rectilinearly but is adapted to be oscillated by the weight under the action of centrifugal force when the car changes direction, said cam like member being shaped to preclude inadvertent shifting of the arm from its normal position while the car is moving rectilinearly.

5. An automobile headlight embodying a housing adapted to be rigidly mounted on an associated car, a source of illumination within said housing, a reflector mounted within the housing for pivotal movement on a vertical axis, a weight associated with the reflector and mounted for oscillatory movement with the reflector and about the same vertical axis as the reflector and positioned with center-of-weight of the combined weight and reflector exteriorly of the axis of rotation of the reflector, a cam member cooperating with the weight and rigid with the housing and adapted to oppose the action of centrifugal force and maintain the reflector in stationary position to reflect the light beam straight ahead so long as the car is moving rectilinearly, said reflector and weight being operable by centrifugal force to oscillate in accordance with changes in directional movements of the car and under the restraining counteracting function of the cam.

In testimony whereof I have signed the foregoing specification.

ROGER REYMOND.